US006759998B2

(12) United States Patent
Schkolnik (10) Patent No.: US 6,759,998 B2
(45) Date of Patent: Jul. 6, 2004

(54) METHOD AND APPARATUS FOR GENERATING A THREE-DIMENSIONAL IMAGE ON AN ELECTRONIC DISPLAY DEVICE

(75) Inventor: Daniel G. Schkolnik, Portland, OR (US)

(73) Assignee: Intel Corporation, Santa Clara, CA (US)

(*) Notice: Subject to any disclaimer, the term of this patent is extended or adjusted under 35 U.S.C. 154(b) by 285 days.

(21) Appl. No.: 10/029,477

(22) Filed: Oct. 19, 2001

(65) Prior Publication Data

US 2003/0076279 A1 Apr. 24, 2003

(51) Int. Cl.[7] .................................................. G09G 5/00
(52) U.S. Cl. .............................................. 345/6; 345/9
(58) Field of Search ......................... 345/6, 9; 355/22; 359/464; 358/445; 348/51

(56) References Cited

U.S. PATENT DOCUMENTS

| 4,959,641 A | * | 9/1990 | Bass et al. ..................... 345/6 |
| 5,438,429 A | * | 8/1995 | Haeberli et al. ............ 358/445 |
| 5,497,189 A | * | 3/1996 | Aritake et al. ................. 348/51 |
| 5,751,479 A | * | 5/1998 | Hamagishi et al. ......... 359/464 |
| 5,917,562 A | * | 6/1999 | Woodgate et al. ............ 349/15 |
| 6,115,101 A | * | 9/2000 | Kainen ........................ 355/22 |

\* cited by examiner

Primary Examiner—Chanh Nguyen
Assistant Examiner—Uchendu O. Anyaso
(74) Attorney, Agent, or Firm—Blakely, Sokoloff, Taylor & Zafman LLP (57) ABSTRACT

A stereoscopic display system which includes a processor and a display device is described. The processor parses a left eye image of a stereoscopic image into a plurality of vertical left eye strips and parses a right eye image of the stereoscopic image into a plurality of vertical right eye strips. The processor then combines the left eye strips and the right eye strips into a display image by interleaving the left eye strips with the right eye strips. The display image is provided to the display device, which includes a lenticular layer which acts as a light guide to steer light from each of the left eye strips and the right eye strips to no more than one corresponding eye of a left eye and a right eye of a viewer, such that the viewer can perceive the display image as having three-dimensions without using special goggles, glasses, or the like.

19 Claims, 7 Drawing Sheets

METHOD AND APPARATUS FOR GENERATING A THREE-DIMENSIONAL IMAGE ON AN ELECTRONIC DISPLAY DEVICE

FIELD OF THE INVENTION

The present invention pertains to image processing devices and techniques. More particularly, the present invention relates to a method and apparatus for generating a three-dimensional image on a display device.

BACKGROUND OF THE INVENTION

Advancements in computer technology, particularly in processing speed and memory capacity, have sparked considerable interest in three-dimensional ("3D") display technology. 3D display technology is desirable in many applications, such as computer games and simulations.

Humans and animals perceive real world objects in 3D, because their eyes detect images in stereo. A stereo effect is caused by the difference between what the left eye sees and what the right eye sees, due to the separation between the two eyes. In a typical adult human, the separation between the left eye and the right eye is approximately 60 to 65 mm. Consequently, the perception of 3D can be provided artificially in a computer system by generating two spatially-offset, 2D left eye and right eye images of the same subject and providing these images separately (i.e., with mutual exclusion) to the left eye and right eye of the viewer. Hence, the difference between the left and right image of a stereoscopic image pair is simply a slight horizontal shift in position. The magnitude of this shift depends, in part, upon the apparent distance of the subject from the viewer (the depth). In computer graphics, depth information is typically stored in a special memory, known as a "z buffer".

Thus, computer-based 3D display techniques generally employ some mechanism to ensure that each eye sees only the appropriate one of the two corresponding views (left or right). With conventional computer 3D techniques, however, the viewer is required to use some form of supplemental viewing apparatus, such as anaglyphs (color-filtered eyeglasses), liquid crystal shutter glasses, or complex, expensive head-mounted devices that have a dedicated display for each eye. Such an apparatus tends to be cumbersome and annoying for the viewer and can be costly. In addition, the necessity of having to use additional viewing equipment normally limits viewing of the 3D image to one viewer at a time. Accordingly, conventional approaches to 3D visualization have yet to gain widespread acceptance.

What is needed, therefore, is a solution which overcomes these and other shortcomings of the prior art.

SUMMARY OF THE INVENTION

The present invention includes a method and apparatus for generating a three-dimensional image. A left eye image and a corresponding right eye image are parsed into multiple left eye strips and multiple right eye strips, respectively. The left eye strips and the right eye strips are interleaved to form a display image. The display image is then provided to a display device. A layer of the display device steers light from each of the left eye strips and right eye strips to no more than one corresponding eye of a left eye and a right eye of a viewer, such that the viewer perceives the display image as being three-dimensional.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for generating a 3D image on an electronic display device are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include a variety of combinations and/or integrations of the embodiments described herein.

As described in greater detail below, a stereoscopic display system includes a processor which parses a left eye image of a stereoscopic image into multiple vertical left eye strips and parses a right eye image of the stereoscopic image into multiple vertical right eye strips. The processor then combines the left eye strips and the right eye strips into a display image by interleaving the left eye strips with the right eye strips. The display image is then provided to a display device of the display system. The display device includes a lenticular layer which acts as a light guide to steer light from the left eye strips to the left eye of the viewer but away from the right eye, and to steer light from the right eye strips to the right eye of the viewer but away from the left eye. This effect causes the viewer to perceive the display image as being in 3D, without the viewer having to use special 3D goggles, glasses, or other additional display apparatus.

Figure 1:
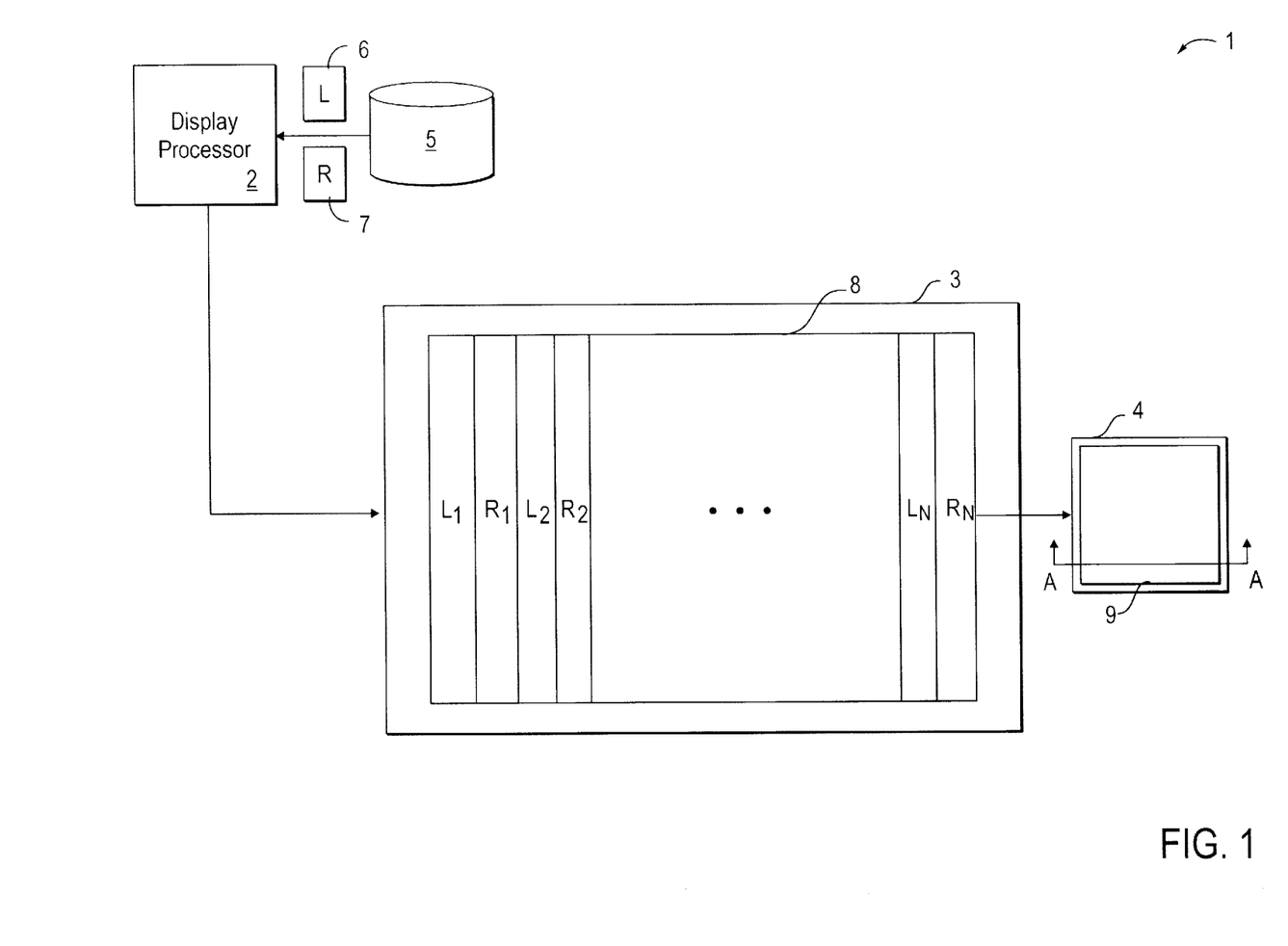
FIG. 1 shows a stereoscopic display system 1 in accordance with the present invention.

Refer now to FIG. 1 which shows a computing system 1 in accordance with the present invention. The computing system 1 may be embodied in the form of any of a variety of different types of computing systems, such as a conventional personal computer (PC), server class computer, workstation, or a handheld computing device, such as a personal digital assistant (PDA), cellular telephone, etc. The computing system 1 includes a display processor 2, a memory 3, and a display device 4. The display processor 2 may be embodied entirely as hardware, or it may be embodied as hardware in combination with software executed by the hardware, or a combination thereof. For example, the display processor 2 may be, or may include, one or more programmable general-purpose or special-purpose microprocessors, digital signal processors (DSPs), programmable controllers, application specific integrated circuits (ASICs), programmable logic devices (PLDs), or a combination of such devices. The display device 4 may be a conventional electronic display device, modified as described below. The display device 4 may be based on any of a variety of display technologies, such as cathode ray tube (CRT), liquid crystal display (LCD), plasma display, field emitter display (FED), electroluminescent (EL) display, electromechanical panel, etc. The memory 3 may be, for example, a frame buffer of the computing system 1.

The display processor 2 receives, from a storage repository 5, a left eye image 6 and an associated right eye image 7 of a stereoscopic image. To facilitate description, it may be assumed that in this context, a left eye image or a right eye image corresponds to an entire display frame, not merely an object depicted within the frame. Note that methods for acquiring separate, corresponding left and right eye images of a subject for purposes of 3D imaging are well-known in the art and are therefore not described herein. Note that while the storage repository 5 is shown as being within the computing system 1, it can alternatively be located remotely with respect to the computing system 1.

The display processor 2 parses the left eye image 6 into multiple vertical left eye strips $L_1, L_2, \ldots, L_N$ and parses the right eye image 7 into multiple vertical right eye strips $R_1, R_2, \ldots, R_N$. Each strip is one or more columns of pixels in width and runs the entire vertical length (all rows) of a standard display frame. All of the left eye strips and right eye strips are of equal width. The processor then combines the left eye strips and the right eye strips into a display image 8 by interleaving the left eye strips with the right eye strips, so that they alternate (left, right, left, right, etc.). The display image 8 is then provided to the display device 4, where it is displayed to the viewer on a display screen 9 of the display device 4.

As described further below, the display screen 9 of the display device 4 has a lenticular layer (not shown in FIG. 1), which acts as a light guide to steer light emanating from the display device 4. The lenticular layer causes light from the left eye strips to reach the left eye of the viewer but not the right eye, and causes light from the right eye strips to reach the right eye of the viewer but not the left eye. This effect causes the viewer to perceive the image as being in 3D, without the viewer having to use special 3D goggles, glasses, or other additional display apparatus.

Figure 2:
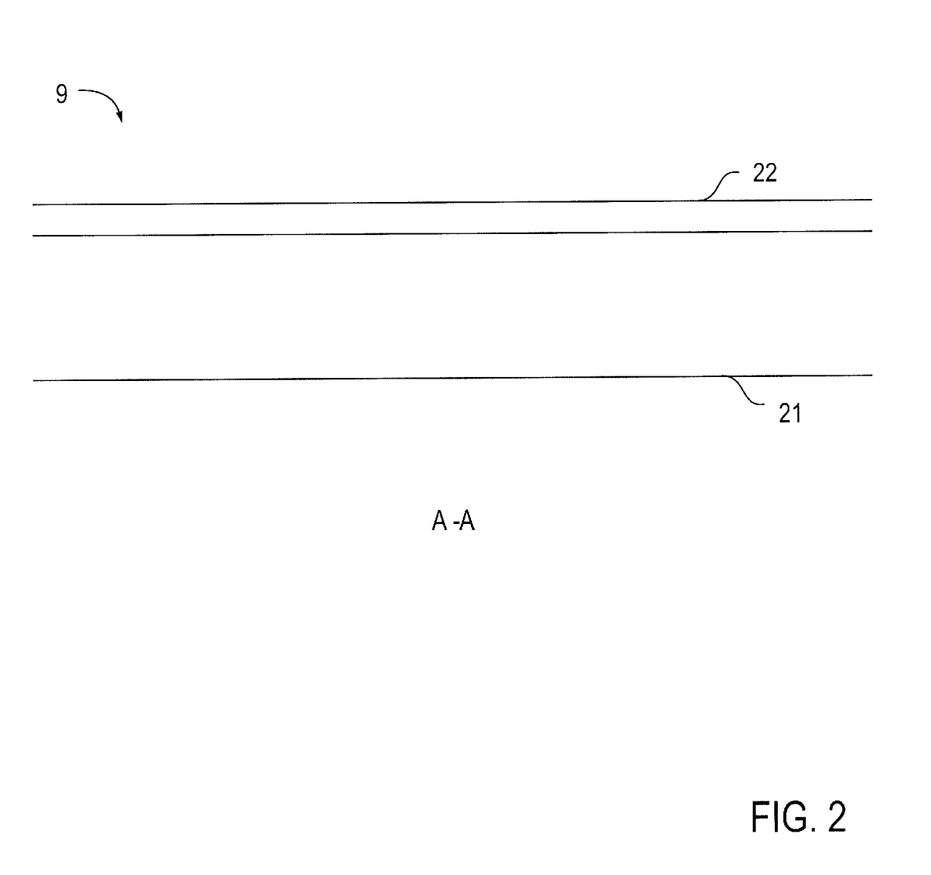
FIG. 2 illustrates a partial, magnified cross-section of the display area of the display device of FIG. 1.

FIG. 2 illustrates a partial, magnified cross-section of the display screen 9 of the display device 4. The display screen 9 of the display device 4 is constructed from one or more substantially planar layers (which may be slightly curved, depending on the type of display technology used). Layer 21 represents one such layer of the display screen 9. Disposed on the external surface of layer 21 (i.e., between layer 21 and the viewer) is an additional layer, lenticular layer 22, which acts as a light guide as described above. In some embodiments, the display screen 9 may include other layers (not shown) of various material compositions. It may be assumed that the lenticular layer 22 represents the outermost layer of the display device, although that is not necessarily the case. What is important is that the lenticular layer 22 is disposed between the pixels of the display device 4 and the viewer. The particular composition of layer 21 will depend on the type of display technology embodied in display device 4. Thus, layer 21 could be, for example, the outer glass layer of a picture tube if display device 4 is a CRT or an outer polarizer if display device 4 is an LCD, for example.

Figure 3:
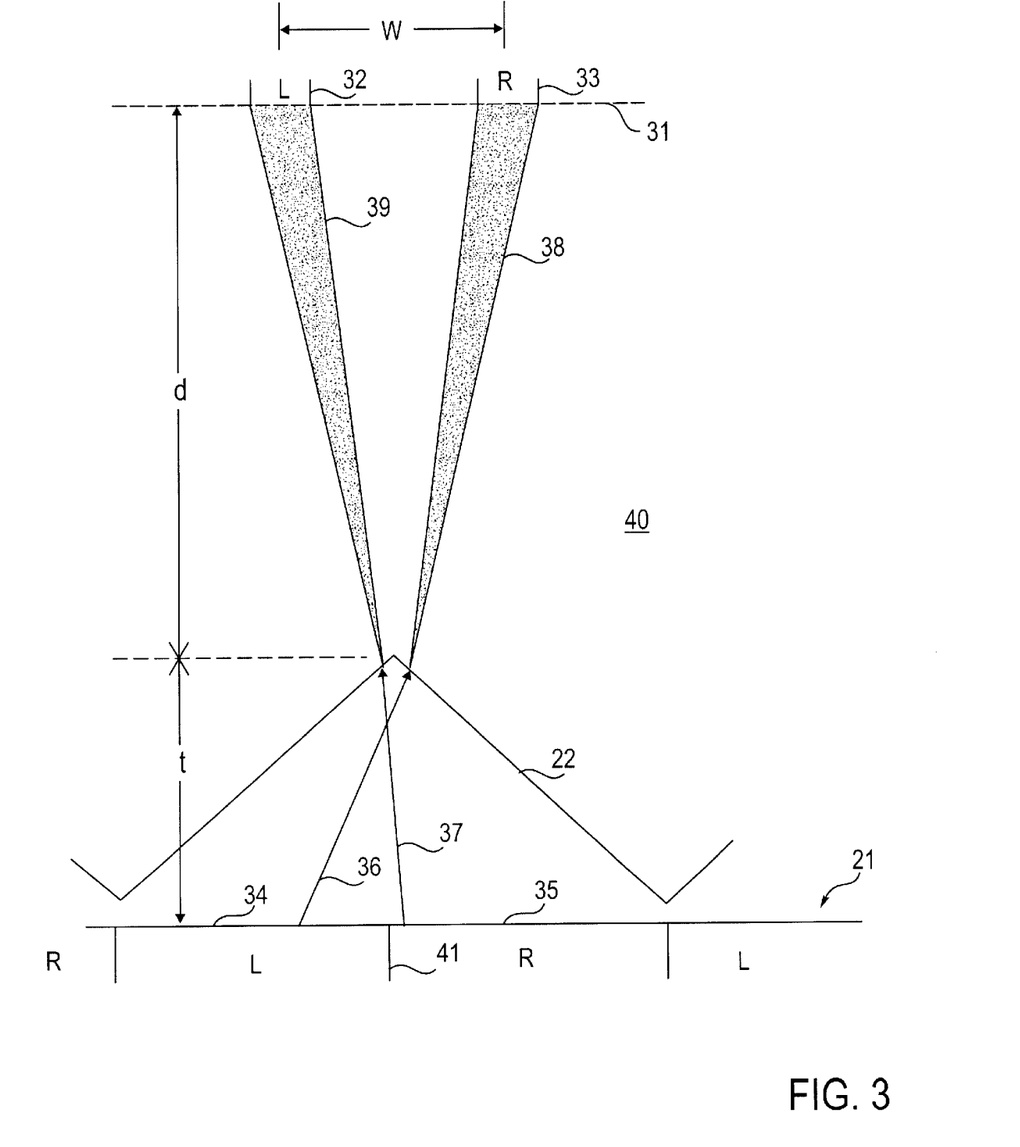
FIG. 3 shows a magnified cross-section of FIG. 2, according to one embodiment.

FIG. 3 shows a magnification of the cross-section of FIG. 2, according to one embodiment. Unmagnified, the lenticular layer 22 appears relatively flat and smooth to the human eye, as depicted in FIG. 2. However, at greater magnification, as in FIG. 3, the lenticular layer 22 has a relatively uneven surface that forms a series of prisms to steer light preferentially to the appropriate eye of the viewer. At the level of magnification represented in FIG. 3, lenticular layer 22 appears in cross-section essentially as a series of triangles (prisms) disposed adjacent to each other from left to right.

Dashed line 31 represents the eye plane of the viewer, i.e., the plane defined by the outer surface of the viewer's eyes, which is assumed to be substantially parallel to the display screen 9 of the display device 4. Windows 32 and 33 represent the spatial windows of light acceptance formed by the iris of the viewer's left eye and right eye, respectively. Note that the distance d from the lenticular layer 22 to the viewer's eyes and the distance w between the viewer's eyes are not drawn to scale relative to the thickness t of the lenticular layer. It may be assumed that the thickness of the lenticular layer is on the order of magnitude of about 1 mm, the distance d from the lenticular layer 22 to the viewer's eyes is on the order of magnitude of about 1000 mm, and the distance w between the viewer's eyes is on the order of magnitude of about 60 mm.

Layer 21 of the display screen includes (or at least transmits light from) a left eye pixel 34 and a right eye pixel 36 from an interleaved left eye strip and right eye strip, respectively. In the embodiment represented in FIG. 3, each eye strip is one pixel in width.

The geometry and composition of the lenticular layer 22 are such that light from each left eye strip (e.g. from pixel 34) is directed to the left eye of the viewer but not to the right eye of the viewer, whereas light from each right eye strip (e.g., from pixel 35) is directed to the right eye of the viewer but not to the left eye of the viewer.

It is not essential that all light from each pixel reaches the corresponding eye; what is important is that none of (or a negligible amount of) the light from each eye strip reaches the wrong eye. For example, assume an arbitrary light ray 36 originating from pixel 34 in a left eye strip strikes the inner edge of the lenticular layer 22 just to the right of its vertex and is transmitted into the air 40 toward the viewer. Associated with ray 36 is a relatively narrow range of exclusion angles 38. The geometry and composition (and therefore, the index of refraction) of the lenticular layer 22 are chosen to prevent the transmission angle of ray 36 from falling within the exclusion range 38 as it leaves the lenticular layer 22, preventing the transmitted ray from entering the right eye of the viewer. Similarly, assume another arbitrary light ray 37 originating from pixel 35 in a right eye strip strikes the inner edge of the lenticular layer 22 just to the left of its vertex and is transmitted into the air 40 toward the viewer. Associated with ray 37 is a relatively narrow range of exclusion angles 39. The geometry and composition of the lenticular layer 22 are chosen so that the transmission of ray 37 into the air 40 will not fall within the exclusion range 39 as it leaves the lenticular layer 22, preventing the transmitted ray from entering the left eye of the viewer. Consequently, the left eye of the viewer receives light only from left eye strips of the displayed image, while the right eye of the viewer receives light only from right eye strips of the displayed image. The result is that the displayed image appears to the viewer to be in 3D.

Lenticular films having the above-described optical characteristics are commercially available off-the-shelf in a variety of different geometries and compositions. However, lenticular films are not known to have been used with electronic display devices. The particular specifications of the lenticular layer 22 depend upon the specific application and use environment contemplated by the system designer and can be easily derived by one of ordinary skill in the art. Accordingly, detailed specifications of the lenticular layer 22 are not provided herein. It is noted, however, that the specifications of the lenticular layer 22 can be derived using the well-known law of optical transmission/reflection (which is a function of the index of refraction of the lenticular layer 22 and air) and will also be based on the expected distance d from the lenticular layer 22 to a typical viewer's eyes and the expected distance w between the typical viewer's left eye and right eye.

Because one cannot guarantee that the vertical axis of symmetry of the lenticular layer 22 will be perfectly aligned with the border 41 between left pixels and right pixels, it is desirable to have the ability to calibrate the 3D display during operation, to compensate for any misalignment. Also, the ability to calibrate during operation can compensate for the fact that any particular viewer may deviate from the design assumptions used to select the lenticular layer 22. The present invention provides such calibration capability, as will now be described.

Figure 4:
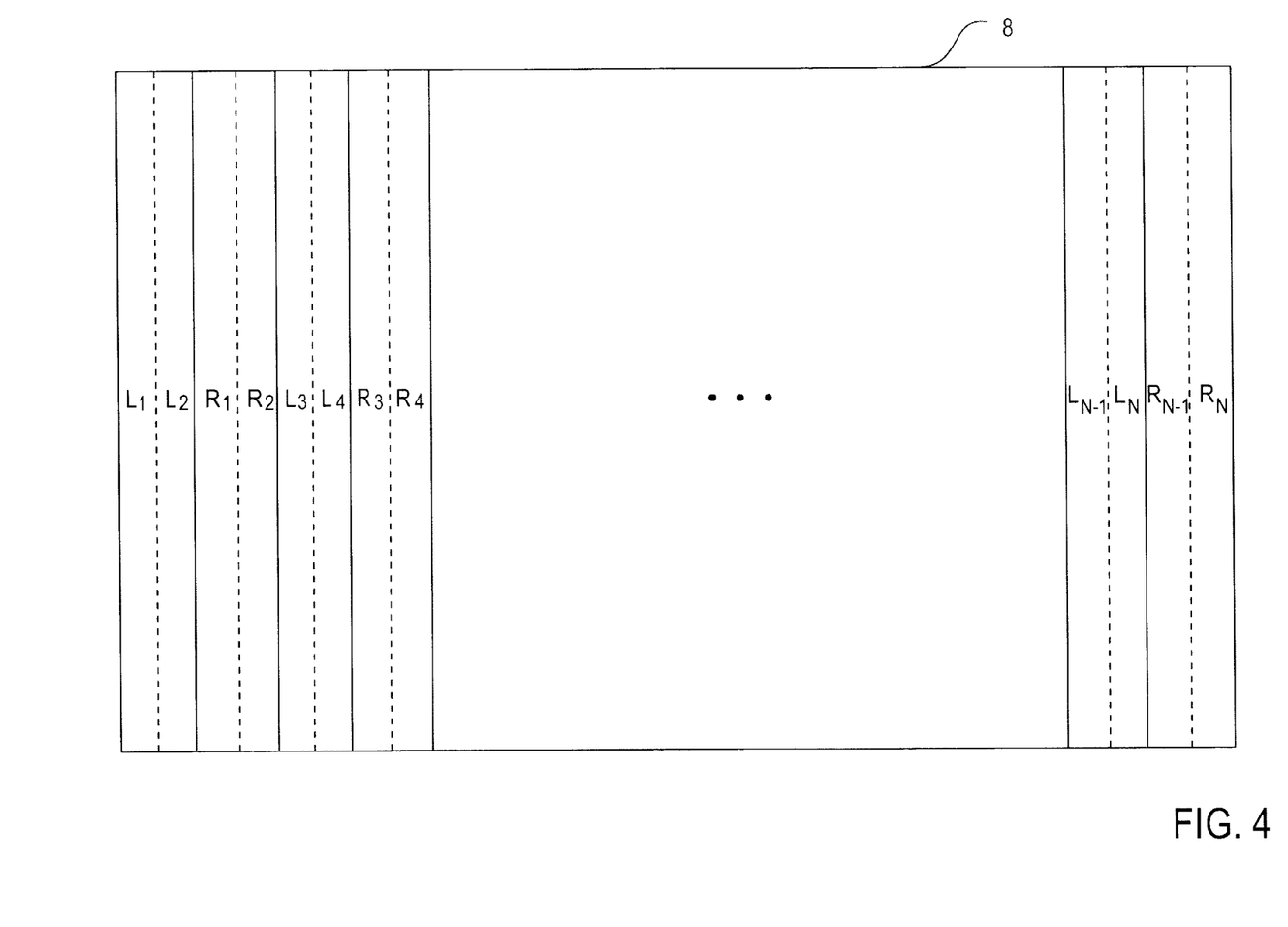
FIG. 4 shows a display image in which each eye strip is multiple pixels wide.
Figure 5:
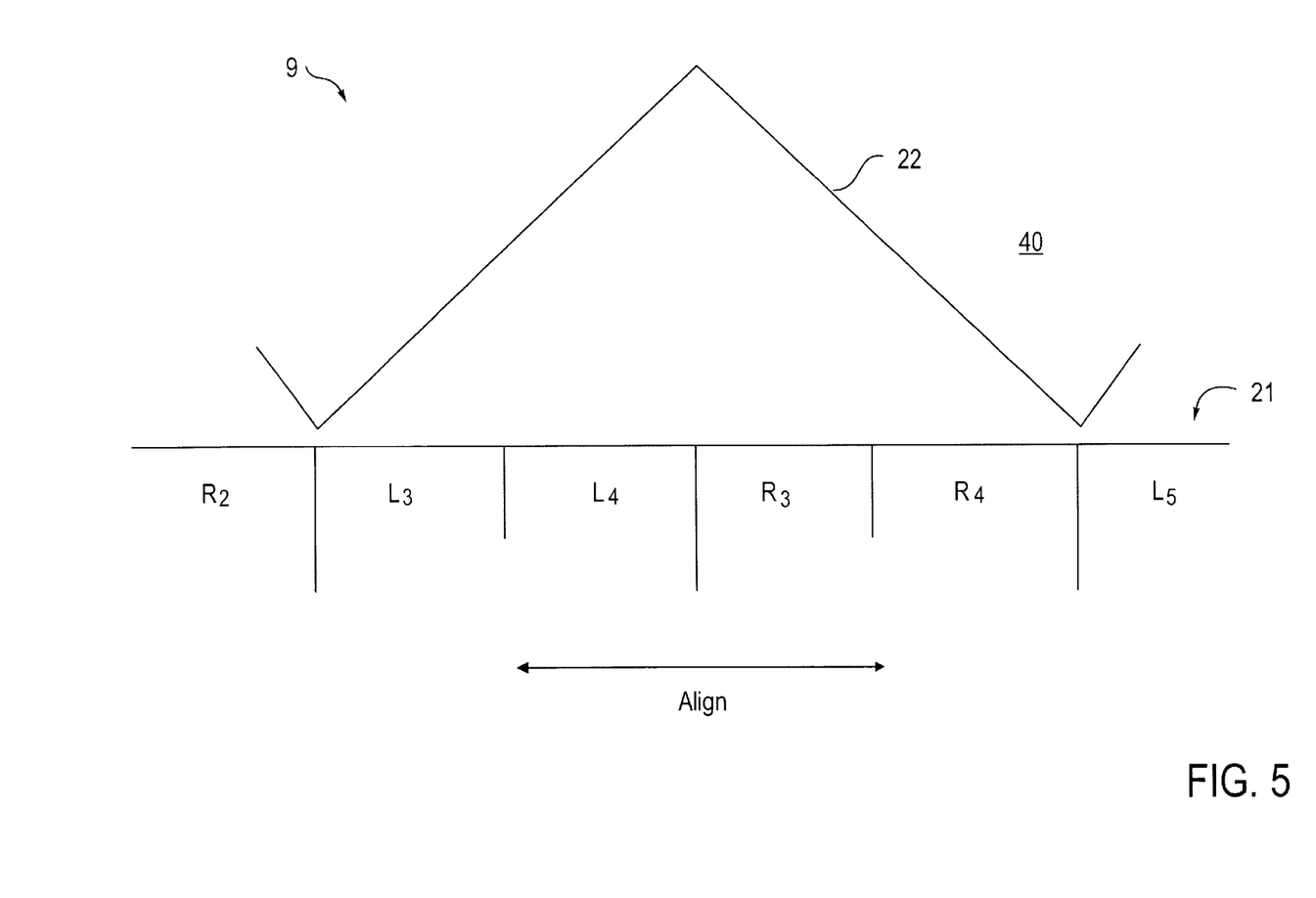
FIG. 5 shows a magnified cross-section of the embodiment of FIG. 5.

As noted above, each of the left eye strips and right eye strips is one or more pixels wide. Calibration of the display is facilitated by designing the eye strips to be multiple pixels in width. Again, it is assumed that all strips (left eye and right eye) are the same width. One such embodiment is shown in FIG. 4, in which each eye strip is two pixels wide. In the embodiment of FIG. 4, the leftmost left eye strip in the display image 8 includes two adjacent one-pixel-wide columns, $L_1$ and $L_2$; the leftmost right eye strip at includes two adjacent one-pixel-wide columns, $R_1$ and $R_2$; etc. FIG. 5 shows an example of a magnified cross-section of the embodiment of FIG. 4. Each triangular (in cross-section) prism of the lenticular layer 22 covers a total of four one-pixel-wide columns, i.e., two adjacent left eye pixels and two adjacent right eye pixels.

Calibration of the display is accomplished by uniformly adjusting the horizontal position of all eye strips to the left or to the right, relative to the stationary lenticular layer 22, on a pixel-by-pixel basis. The effect is to provide fine tuning of the angles at which light from the eye strips strikes the interface between the lenticular layer 22 and the air 40. This adjustment may be performed by the display processor 2 (FIG. 1), but may be in response to direct user input. Thus, a viewer can operate any conventional hardware or software control (e.g., a slider bar) to fine tune the image until it appears to be correct. The adjustment normally will be uniform for all pixel rows of the display image; however, the display processor 2 may have the ability to vary the amount of adjustment for individual rows, to compensate for possible physical variations in the lenticular layer 22 in the vertical direction (such as due to manufacturing defects, for example).

Figure 6A:
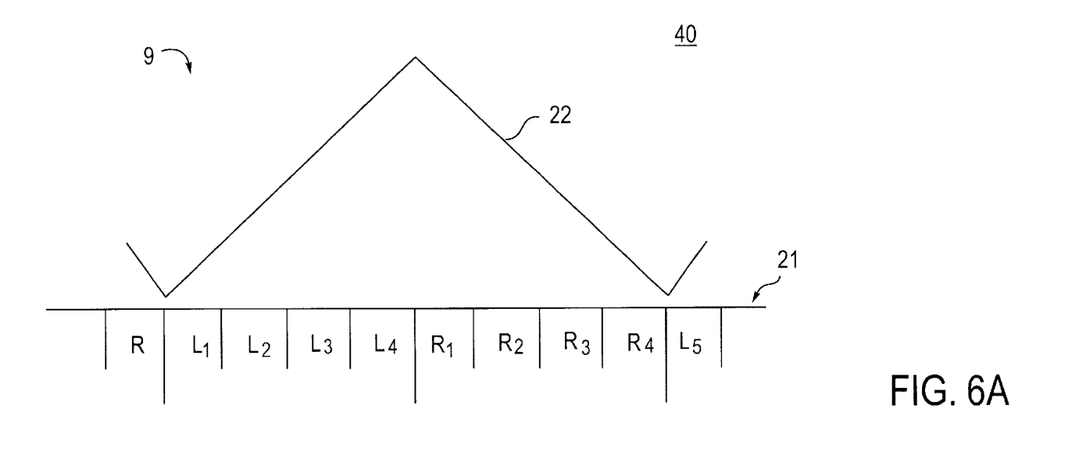
FIGS. 6A and 6B show magnified cross-sections of the display area before and after a calibration adjustment, respectively, in which each eye strip is four pixels wide.
Figure 6B:
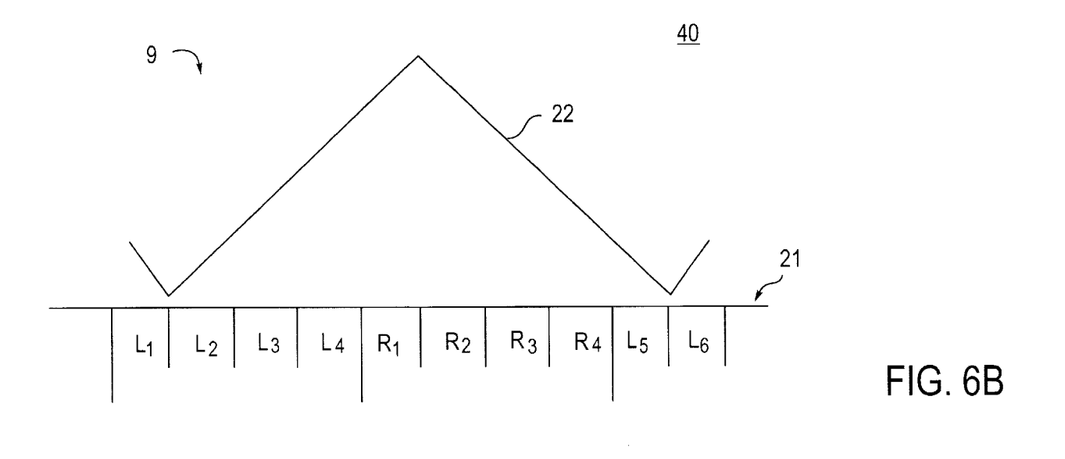

Greater precision in the calibration process may be achieved by using eye strips that are a greater number of pixels in width. An example of such an embodiment is shown in FIGS. 6A and 6B. FIGS. 6A and 6B show magnified cross-sections of the display area 9 before and after a calibration adjustment, respectively, in which each eye strip is four pixels wide. The illustrated embodiment allows more precise calibration than the embodiment in which each eye strip is only two pixels wide. As illustrated, a calibration adjustment is accomplished by simply reassigning pixel values horizontally along the display area 9, so that each pixel is assigned the value of one of the immediately adjacent pixels.

FIG. 6A shows an example of the display before a calibration adjustment, while FIG. 6B shows an example of the display after adjusting the display to the left by one pixel. Again, all eye strips are shifted by the same amount (and normally, all rows are shifted uniformly). As shown, the result of this adjustment is that each pixel receives the value of the pixel which was immediately to its right. Thus, the pixel initially in position $L_1$ receives the value of the pixel that was initially in position $L_2$; the pixel initially in position $L_2$ receives the value of the pixel initially in position $L_3$; and so forth.

Figure 7:
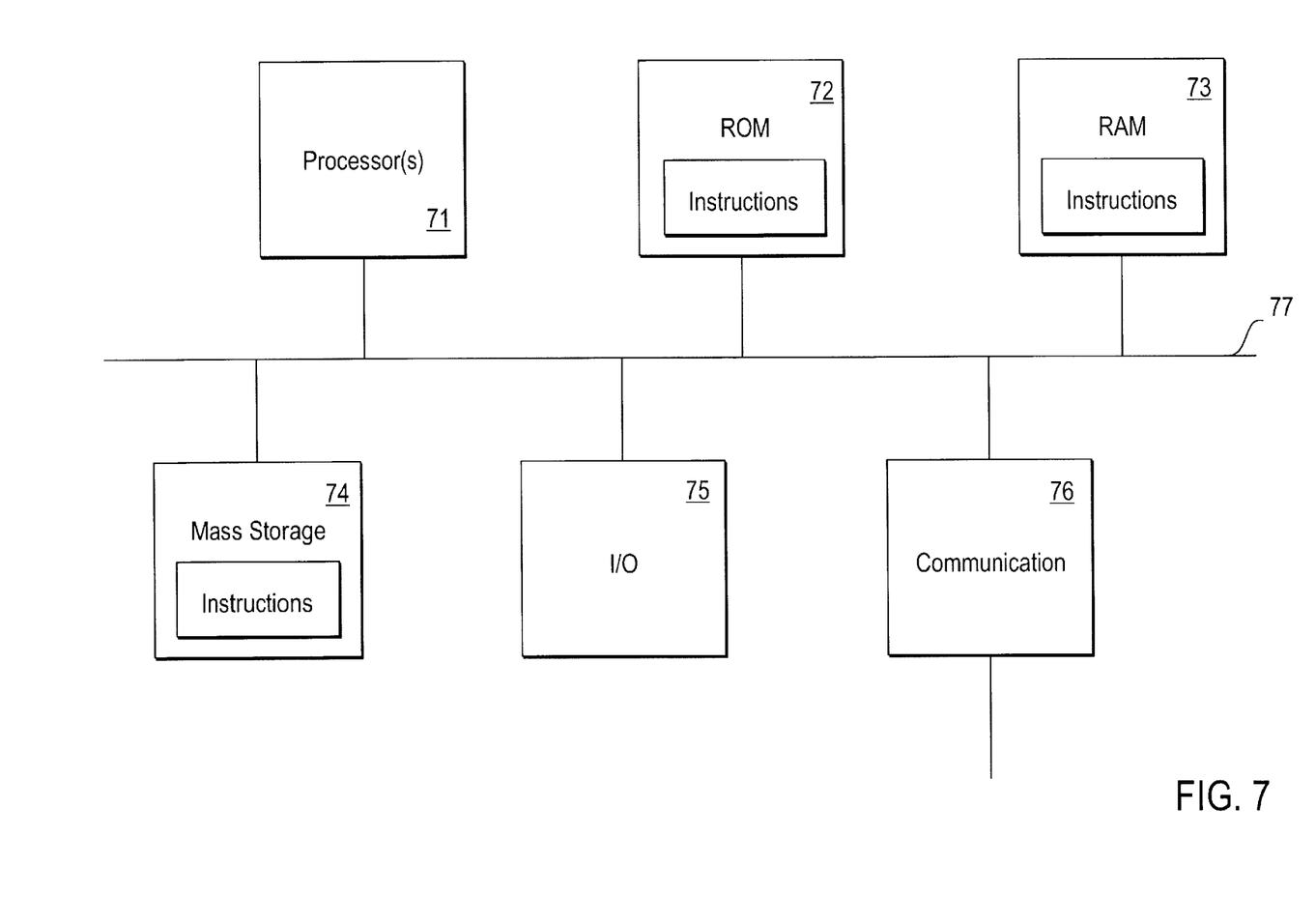
FIG. 7 shows an example of a processing system in which the stereoscopic display system can be implemented.

The display system described above can be implemented in any of various types of computing platforms, as mentioned above. FIG. 7 shows an abstraction of such a computing platform. The illustrated system includes one or more processors 71, i.e. a central processing unit (CPU), read-only memory (ROM) 72, and random access memory (RAM) 73, which may be coupled to each other by a bus system 77 and/or by direct connections. The processor(s) 71 may be, or may include, one or more programmable general-purpose or special-purpose microprocessors, digital signal processors (DSPs), programmable controllers, application specific integrated circuits (ASICs), programmable logic devices (PLDs), or a combination of such devices. The bus system 77 (if any) includes one or more buses or other connections, which may be connected to each other through various bridges, controllers and/or adapters, such as are well-known in the art. For example, the bus system 77 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

Also coupled to the bus system 77 are one or more mass storage devices 74, input/output (I/O) devices 75, and data communication devices 76. Each mass storage device 74 may be, or may include, any one or more devices suitable for storing large volumes of data in a non-volatile manner, such as a magnetic disk or tape, magneto-optical (MO) storage device, or any of various forms of Digital Versatile Disk (DVD) or Compact Disk (CD) based storage, or a combination thereof.

Each data communication device 76 is a device suitable for enabling the processing system to communicate data with remote devices and may be, for example, a wireless transceiver (e.g., in the case of a mobile device), a conventional modem, a Digital Subscriber Line (DSL) modem, a cable modem, an Ethernet adapter, an Integrated Services Digital Network (ISDN) adapter, a satellite transceiver, or the like.

The I/O device(s) 75 include the display device 4 of the present invention (FIG. 1) and may also include, for example, a keyboard or keypad and a pointing device (e.g., a mouse, trackball, or touchpad), for example. Many variations on the above described embodiment are possible.

The display processes and operations described above (e.g., parsing, interleaving, and calibrating images) may be implemented in software 78, which may reside, either partially or completely, in any of RAM 73, mass storage device 74 and/or ROM 72, as shown, which is executed by processor(s) 71.

Thus, a method and apparatus for generating a 3D image on an electronic display device have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method as of generating a three-dimensional image, the method comprising:
   parsing a left eye image and a corresponding right eye image into a plurality of left eye strips and a plurality of right eye strips, respectively;
   interleaving the left eye strips and the right eye strips to form a display image;
   providing the display image to a display device;
   using a layer of the display device to steer light from each of the left eye strips and right eye strips to no more than one corresponding eye of a left eye and a right eye of a viewer, to enable the viewer to perceive the display image as being three-dimensional; and
   calibrating the stereoscopic image by adjusting a positioning of the left eye strips and the right eye strips relative to said layer, wherein each of the left eye strips and the right eye strips is a plurality of pixels in width, and wherein said adjusting the positioning comprises replacing a value of each pixel in said strips with the value of an adjacent pixel.

2. A method as recited in claim 1, wherein:
   said parsing the left eye image comprises parsing the left eye image into a plurality of vertical left eye strips oriented parallel to each other and to a vertical axis of the display image; and
   said parsing the right eye image comprises parsing the right eye image into a plurality of vertical right eye strips oriented parallel to each other and to the vertical axis of the stereoscopic image.

3. A method as recited in claim 2, wherein said combining the left eye strips and the right eye strips into an image comprises interleaving the left eye strips with the right eye strips so as to alternate, with respect to a horizontal axis perpendicular to the vertical axis, between left eye strips and right eye strips.

4. A method as recited in claim 1, wherein said adjusting comprises adjusting the positioning of the left eye strips and the right eye strips along the horizontal axis relative to said layer.

5. A method as recited in claim 1, wherein said calibrating is in response to user input.

6. A method as recited in claim 1, wherein said using the layer of the display device comprises the layer of the display device to selectively steer light from the left eye strips away from a right eye of a viewer and to selectively steer light from the right eye strips away from a left eye of the viewer, such that the viewer can perceive the stereoscopic image as having three-dimensions.

7. A method as recited in claim 1, wherein the layer comprises a lenticular layer.

8. A method of generating a three-dimensional image, the method comprising:
   receiving a left eye image and a right eye image of a stereoscopic image;
   using a processor to parse the left eye image into a plurality of left eye vertical strips oriented parallel to each other and to a vertical axis and to parse the right eye image into a plurality of right eye vertical strips oriented parallel to each other and to a vertical axis of the stereoscopic image;
   using the processor to combine the left eye vertical strips and the right eye vertical strips into a display image by interleaving the left eye vertical strips with the right eye vertical strips so as to alternate, with respect to a horizontal axis perpendicular to the vertical axis, between left eye vertical strips and right eye vertical strips; and
   providing the display image to an electronic display device;
   using a lenticular layer of the electronic display device to selectively steer light corresponding to the left eye vertical strips away from a right eye of a viewer and to selectively steer light corresponding to the right eye vertical strips away from a left eye of the viewer, to enable the viewer to perceive the display image as being three-dimensional; and
   calibrating a stereoscopic effect of the image by adjusting a positioning of the left eye vertical strips and right eye vertical strips along the horizontal axis relative to the lenticular layer, wherein each of the left eye strips and the right eye strips is a plurality of pixels in width, and wherein said adjusting the positioning comprises replacing a value of each pixel in said strips with the value of an adjacent pixel.

9. A method as recited in claim 8, wherein said adjusting is in response to user input.

10. A 3D display system comprising:
    a processor to
      parse a left eye image of a stereoscopic image into a plurality of left eye strips and parse a right eye image of the stereoscopic image into a plurality of right eye strips, and
      combine the left eye strips and the right eye strips into a display image by interleaving the left eye strips with the right eye strips; and
    a display device coupled to the processor to display the display image, the display device including a light guide to steer light from each of the left eye strips and the right eye strips to no more than one corresponding eye of a left eye and a right eye of a viewer, to enable the viewer to perceive the display image as being three-dimensional;
    wherein the processor is further to adjust a positioning of the left eye strips and the right eye strips relative to the light guide to calibrate a stereoscopic effect of the image, and wherein each of the left eye strips and the right eye strips is a plurality of pixels in width, and wherein the processor is to further to adjust the positioning by replacing a value of each pixel in said strips with the value of an adjacent pixel.

11. A 3D display system as recited in claim 10, wherein the processor is to parse the left eye image into a plurality of vertical left eye strips oriented parallel to each other and to a vertical axis of the stereoscopic image and to parse the right eye image into a plurality of vertical right eye strips oriented parallel to each other and to the vertical axis of the stereoscopic image.

12. A 3D display system as recited in claim 11, wherein the processor is to combine the left eye strips and the right eye strips into an image by interleaving the left eye strips with the right eye strips so as to alternate, with respect to a horizontal axis perpendicular to the vertical axis, between left eye strips and right eye strips.

13. A 3D display system as recited in claim 10, wherein the adjustment is in response to user input.

14. A 3D display system as recited in claim 10, wherein the light guide comprises a lenticular film.

15. An apparatus comprising:

means for parsing a left eye image and a corresponding right eye image into a plurality of left eye strips and a plurality of right eye strips, respectively;

means for interleaving the left eye strips and the right eye strips to form a display image; and a display device including a lenticular layer to steer light from each of the left eye strips and right eye strips to no more than one corresponding eye of a left eye and a right eye of a viewer, to enable the viewer to perceive the display image as being three-dimensional, and means for calibrating a stereoscopic effect of the image by adjusting a positioning of the left eye strips and the right eye strips along the horizontal axis relative to the lenticular layer, wherein each of the left eye strips and the right eye strips is a plurality of pixels in width, and wherein said adjusting the positioning comprises replacing a value of each pixel in said strips with the value of an adjacent pixel.

16. An apparatus as recited in claim 15, wherein:

said means for parsing the left eye image comprises means for parsing the left eye image into a plurality of vertical left eye strips oriented parallel to each other and to a vertical axis of the stereoscopic image; and said means for parsing the right eye image comprises means for parsing the right eye image into a plurality of vertical right eye strips oriented parallel to each other and to the vertical axis of the stereoscopic image.

17. An apparatus as recited in claim 16, wherein said means for combining the left eye strips and the right eye strips into an image comprises means for interleaving the left eye strips with the right eye strips so as to alternate, with respect to a horizontal axis perpendicular to the vertical axis, between left eye strips and right eye strips.

18. An apparatus as recited in claim 15, wherein said calibrating is in response to user input.

19. An apparatus as recited in claim 15, wherein the lenticular layer steers light from the left eye strips away from a right eye of a viewer and steers light from the right eye strips away from a left eye of the viewer, such that the viewer perceives the display image as being three-dimensional.

\* \* \* \* \*